(12) United States Patent
Washio

(10) Patent No.: US 9,211,844 B2
(45) Date of Patent: Dec. 15, 2015

(54) SLIDE STRUCTURE

(75) Inventor: Yosuke Washio, Hiroshima (JP)

(73) Assignee: NIFCO INC., Yokohama-Shi, Kanagawa-Ken (JP)

( * ) Notice: Subject to any disclaimer, the term of this patent is extended or adjusted under 35 U.S.C. 154(b) by 34 days.

(21) Appl. No.: 14/126,662

(22) PCT Filed: Jun. 15, 2012

(86) PCT No.: PCT/JP2012/065418
§ 371 (c)(1),
(2), (4) Date: Jan. 24, 2014

(87) PCT Pub. No.: WO2012/173249
PCT Pub. Date: Dec. 20, 2012

(65) Prior Publication Data
US 2014/0138975 A1 May 22, 2014

(30) Foreign Application Priority Data

Jun. 17, 2011 (JP) ................. 2011-134905

(51) Int. Cl.
*B60R 7/04* (2006.01)
*B60N 2/46* (2006.01)

(52) U.S. Cl.
CPC ............... *B60R 7/04* (2013.01); *B60N 2/4646* (2013.01); *B60N 2/4686* (2013.01)

(58) Field of Classification Search
CPC ........ B60N 2/46; B60N 2/468; B60N 2/4686; B60N 3/08; B60N 3/10; B60N 3/101; B60R 7/04; B60R 2011/0003; B60R 2011/0007; B60R 2011/0012; B60R 2011/0014
USPC ................. 296/1.09, 24.34, 37.1, 37.8, 37.15; 224/281; 297/188.19, 411.21, 411.35
See application file for complete search history.

(56) References Cited

U.S. PATENT DOCUMENTS

| | | | |
|---|---|---|---|
| 6,045,173 A * | 4/2000 | Tiesler et al. | 296/37.8 |
| 7,029,049 B2 * | 4/2006 | Rockafellow et al. | 296/37.8 |
| 7,731,258 B2 * | 6/2010 | Bazinski et al. | 296/37.8 |
| 8,162,369 B2 * | 4/2012 | Tsuda et al. | 296/24.34 |
| 2003/0107228 A1 * | 6/2003 | Ono et al. | 296/24.1 |
| 2004/0108740 A1 * | 6/2004 | Maierholzner | 296/1.09 |
| 2007/0262632 A1 * | 11/2007 | Cody et al. | 297/411.35 |

(Continued)

FOREIGN PATENT DOCUMENTS

| | | |
|---|---|---|
| JP | S64-032250 U | 2/1989 |
| JP | H06-010038 U | 2/1994 |

(Continued)

OTHER PUBLICATIONS

PCT, International Search Report for PCT/JP2012/065418.

*Primary Examiner* — Jason S Daniels
(74) *Attorney, Agent, or Firm* — Manabu Kanesaka

(57) ABSTRACT

A slide structure has a first member maintaining a constant width; a second member covering at least two side portions of the first member in a width direction, and slidably assembled relative to the first member; and an urging device interposed between the first member and the second member. In at least one member of either the first member or the second member, an inclined face inclining relative to the width direction of the first member is provided at a portion wherein the first member and the second member slide, and in the other member of either the first member or the second member, the urging device is interposed between a portion facing the inclined face of the one member and the inclined face to be urged in a direction to separate the facing portion and the inclined face from each other.

9 Claims, 11 Drawing Sheets

(56) References Cited

U.S. PATENT DOCUMENTS

| | | | |
|---|---|---|---|
| 2009/0256376 A1* | 10/2009 | Schneider et al. | 296/24.34 |
| 2012/0049601 A1* | 3/2012 | von Rothkirch und Panthen et al. | 297/411.2 |

FOREIGN PATENT DOCUMENTS

| | | |
|---|---|---|
| JP | 2000-159026 A | 6/2000 |
| JP | 2004-058832 A | 2/2004 |
| JP | 2005-254881 A | 9/2005 |

* cited by examiner

SLIDE STRUCTURE

RELATED APPLICATIONS

The present application is National Phase of International Application No. PCT/JP2012/065418 filed Jun. 15, 2012, and claims priority from Japanese Application No. 2011-134905 filed Jun. 17, 2011.

FIELD OF TECHNOLOGY

The present invention relates to a slide structure.

BACKGROUND ART

Recently, a slide structure is being developed, in which a first member maintaining a constant width and a second member covering at least two width-direction side portions of the first member are relatively slidably assembled, and an urging device is interposed between the first member and the second member.

For example, in Patent Document 1, a slide structure for an armrest in a console box is disclosed, in which two width-direction (lateral-direction) side portions of a slider (a first member) are slidably supported by a pair of side-rails, (second members) attached to a vehicle body side (a box main body side), and an urging device is respectively interposed between each side-rail and each side portion in the width direction of the slider. According to the Patent Document 1, wobbling in the width direction of the slider can be controlled so as to obtain a stable usability.

PRIOR ART DOCUMENT

Patent Document

Patent Document 1: Japanese Unexamined Patent Application Publication No. 2005-254881

SUMMARY OF THE INVENTION

Problems to be Solved by the Invention

In the slide structure in the Patent Document 1, however, although the wobbling in the width direction of the slider (the first member) can be controlled, the wobbling in a direction (an up-and-down direction) facing a plate face of the slider is not considered, so that the wobbling in that direction cannot be controlled. Consequently, if the wobbling in the direction facing the plate face of the slider is attempted to be controlled as well, a specialized urging device thereof is newly required so as to increase the number of components.

The present invention is made in view of the aforementioned circumstances, and an object of the present invention is to provide a slide structure which can control the wobbling in the width direction of the first member and in the direction facing the plate face of the first member without increasing the number of components.

Means for Solving the Problems

In order to obtain the aforementioned object, the present invention is a slide structure in which a first member maintaining a constant width is slidably assembled relative to a second member covering at least two side portions of the first member in a width direction, and an urging device is interposed between the first member and the second member. In at least one member of either the first member or the second member, there is provided an inclined face inclining relative to the width direction of the first member at a portion wherein the first member and the second member slide. In the other member of either the first member or the second member, the aforementioned urging device is interposed between a portion facing the inclined face of the aforementioned one member and the inclined face so as to have a structure urged in a direction to separate the facing portion and the inclined face from each other.

In the slide structure according to the present invention, if an angle of the inclined face is set approximately at 45 degrees relative to the width direction of the first member, an urging force of the urging device can be equally divided into a component force in the width direction of the first member and a component force in a direction facing a plate face of the first member so as to effectively control wobbling in the width direction of the first member and in the direction facing the plate face of the first member.

In the slide structure according to the present invention, if the urging device is detachably provided in at least one of either the first or second member, the urging device can be appropriately replaced by an urging device having a different urging force so as to easily adjust the urging force.

In the slide structure according to the present invention, if the urging device includes a pressing piece displaceably supported in at least one of either the first or second member, and a spring urging the pressing piece toward the other member, an urging force is generated by using the pressing piece and the spring. Namely, the wobbling in the width direction of the first member and in the direction facing the plate face of the first member can be controlled.

In the slide structure according to the present invention, if the urging device is a flexure piece integrally provided in at least one of either the first or second member, the number of management components can be reduced so as to ease management burdens.

If the slide structure according to the present invention is used by being interposed between a box main body and a lid body forming an armrest on an upper side of the box main body in a console box, it is preferable in the armrest which slides.

Effect of the Invention

According to the present invention, based on the inclined face of at least one member of either the first member or the second member, the urging force of the urging device can be divided into the component force in the width direction of the first member and the component force in the direction facing the plate face of the first member so as to allow each component force thereof to act between the first and second members. Consequently, even if an urging device for controlling the wobbling in the direction facing the plate face of the first member is not newly provided (even if the number of components is not increased), due to both component forces described hereinabove, the wobbling can be controlled not only in the width direction of the first member but also in the direction facing the plate face of the first member.

BEST MODES OF CARRYING OUT THE INVENTION

Hereinafter, an embodiment of the present invention will be explained with reference to attached drawings.

Figure 1:
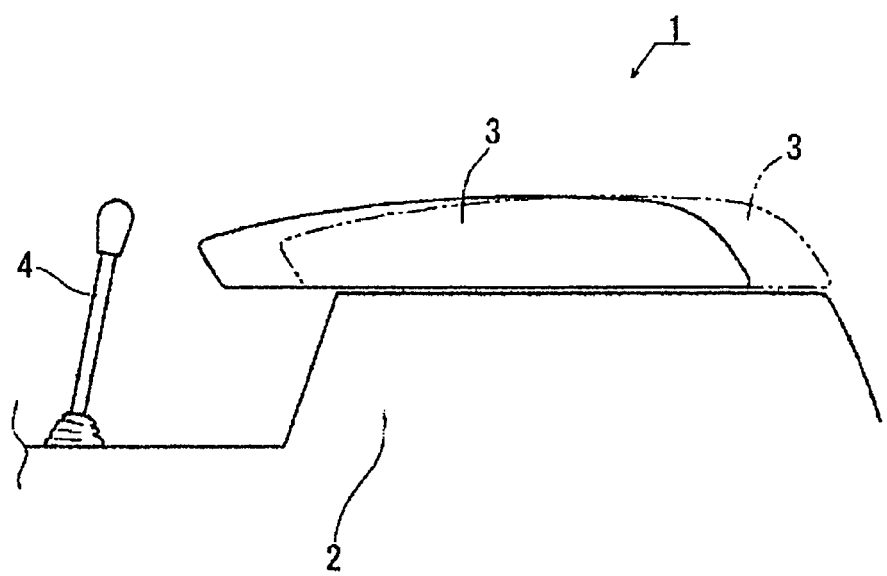
FIG. 1 is an explanatory drawing showing a slide of a lid body in a console box according to an embodiment of the present invention.
Figure 2:
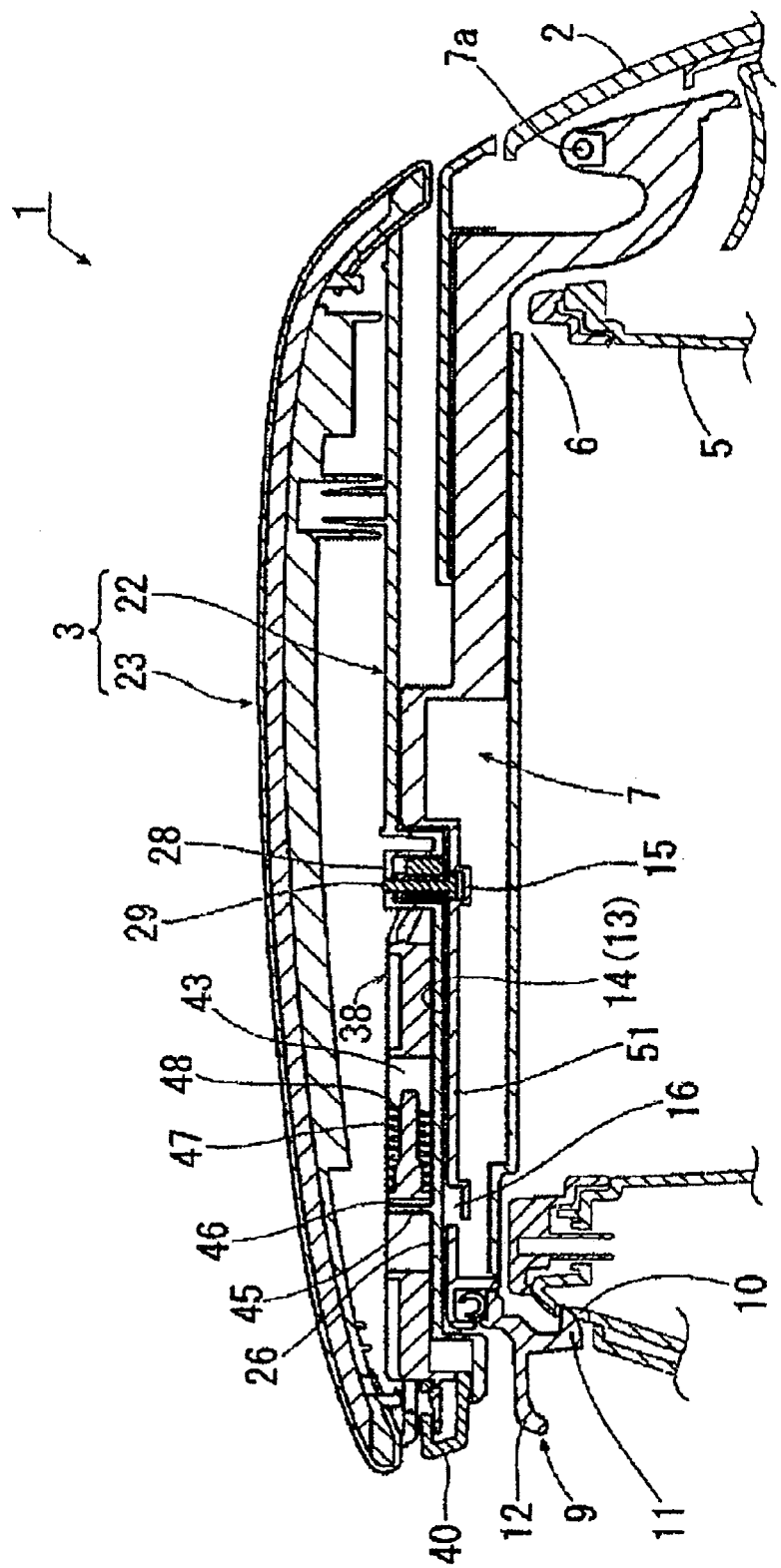
FIG. 2 is an expanded vertical cross-sectional view showing a state wherein the lid body is in a non-protrusion state in the console box according to the embodiment.
Figure 3:
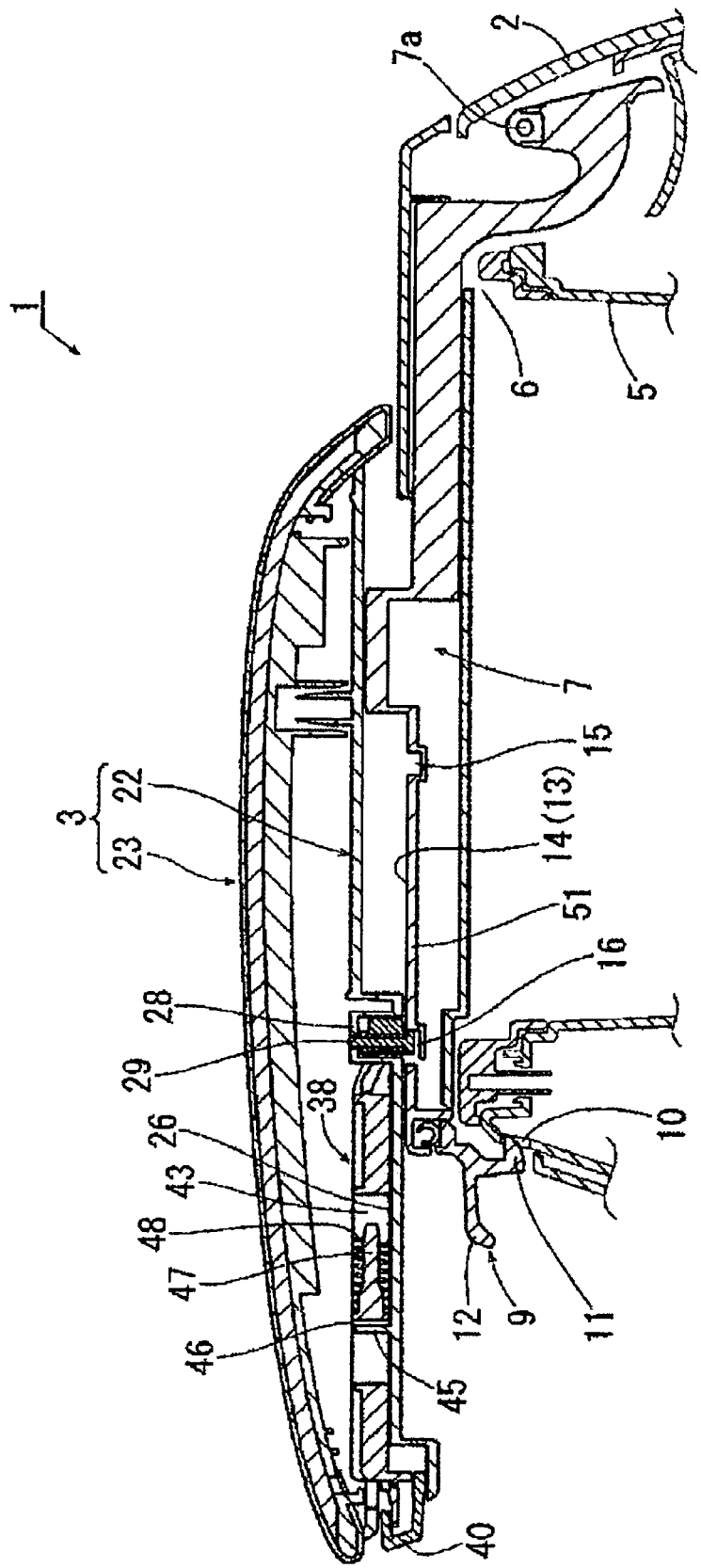
FIG. 3 is an expanded vertical cross-sectional view showing a state wherein the lid body is in a protrusion state in the console box according to the embodiment.

In FIG. 1 to FIG. 3, the reference numeral 1 represents a console box extending in a front-back direction (a right-and-left direction in FIG. 1). The console box 1 comprises a box main body 2 and a lid body (a lid) 3 disposed on the box main body 2.

As shown in FIG. 1 to FIG. 3, the box main body 2 is fixed on a floor inside an automobile, and the box main body 2 is disposed on a backward side of a shift lever 4. Inside the box main body 2, there is formed a housing portion 5, and in the housing portion 5 thereof, there is formed an opening 6 opening toward an external upper side. Through the opening 6, a small article and the like can be taken in and out relative to an inside of the housing portion 5.

In the box main body 2, there is provided with a base body 7 (a first member) to be formed as an upper wall portion in an upper portion thereof. The base body 7 is formed as a long plate body corresponding to the opening 6 of the housing portion 5, and in a back portion thereof (a right side in FIG. 2 and FIG. 3), there is provided a support portion 7a. In a front portion thereof (a left side in FIG. 2 and FIG. 3), there is attached an operation lever 9. The support portion 7a is turnably supported in a back portion of the box main body 2, and the base body 7 can open and close (rising and falling movements) the opening 6 of the housing portion 5 by a turn of the support portion 7a thereof. In that case, a spring which is not shown in the figures is interposed between the support portion 7a and the box main body 2. By the spring, the base body 7 is urged in an open direction. The operation lever 9 is turnably supported in a front-portion lower face of the base body 7.

The operation lever 9 includes a locking claw portion 11 for being locked in a locking hole 10 formed in the box main body 2, and a lever portion 12 for opening and closing operations by an occupant, and when the locking claw portion 11 is locked in the locking hole 10, the base body 7 is maintained in a state closing the opening 6 of the housing portion 5. When the locking claw portion 11 is disengaged from the locking hole 10 of the box main body 2 by turning the lever portion 12 in such a way as to lift the lever portion 12 upward, the base body 7 rises toward a backward side by an urging force of the spring which is not shown in the figures so as to open the opening 6 of the housing portion 5.

Figure 4:
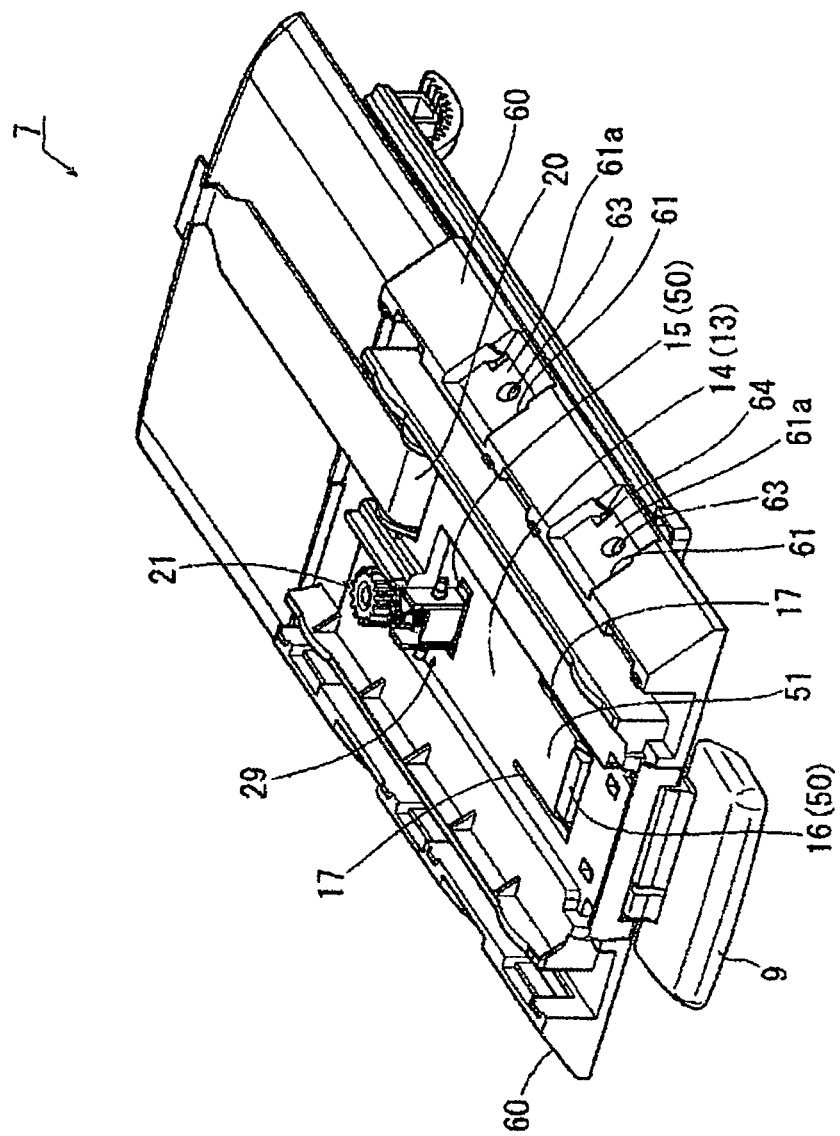
FIG. 4 is a perspective view showing a base body according to the embodiment.
Figure 5:
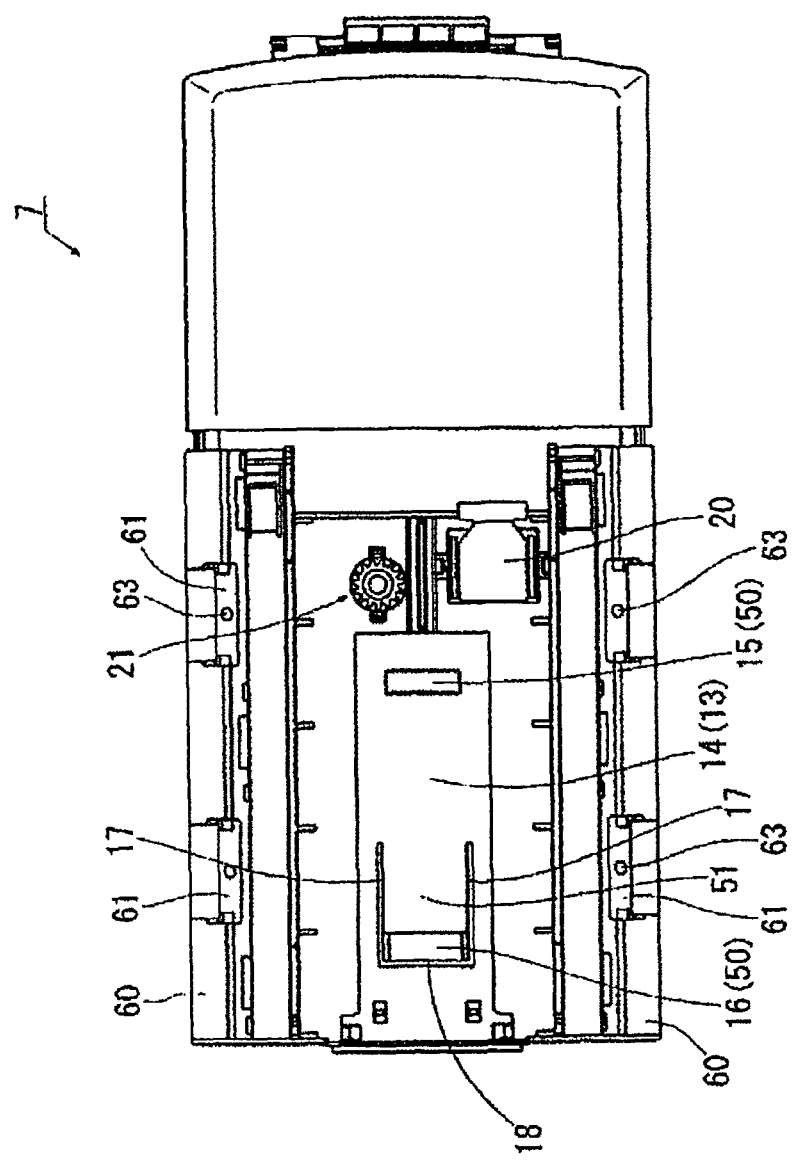
FIG. 5 is a plan view showing the base body according to the embodiment.

As shown in FIG. 2 to FIG. 5, the base body 7 has a flattened structural body having an internal space, and in an upper face portion 13 thereof, a flat face 14 is ensured in between up to approximately a center portion in a front-back direction from a front portion thereof in a center portion in a width direction thereof (an up-and-down direction in FIG. 5). In the flat face 14 of the base body 7, there are formed a first positioning recess 15 and a second positioning recess 16 in a state away from each other in the front-back direction. The first positioning recess 15 is positioned on a backward side more than the second positioning recess 16, and the second positioning recess 16 is positioned slightly on a backward side more than the front portion of the base body 7. In the present embodiment, sponge materials 50 are respectively placed on bottom faces inside the first and second positioning recesses 15 and 16.

Also, as shown in FIG. 2 to FIG. 5, in the flat face 14 of the base body 7, a cantilever piece portion 51 is formed somewhat on a backward side more than a front portion thereof. The cantilever piece portion 51 is formed in a C shape in a plan view by forming a pair of slits 17 extending in the front-back direction, and a slit 18 connecting front end sides of the pair of slits 17 in the base body 7. The cantilever piece portion 51 can bend in a thickness direction of the base body 7 based on a back end side of the pair of slits 17. A top face of an end portion (a front end portion) of the cantilever piece portion 51 is formed to be receded with a step somewhat on a lower side relative to a backward-side portion of the end portion of the cantilever piece portion 51, and the aforementioned second positioning recess 16 is formed based on an end portion shape of the cantilever piece portion 51.

As shown in FIG. 4, FIG. 5, FIG. 7, and FIG. 9, in the base body 7, there are respectively formed slide guide faces (inclined faces) 60 in both width-direction side portions thereof as a formation portion of one slide structural portion of a slide structure. Each slide guide face 60 extends backward in a longitudinal direction thereof from a front end of the base body 7, and each slide guide face 60 thereof has the inclined face inclined in such a way as to come close to a lower face side of the base body 7 as each slide guide face 60 goes outward in the width direction of the base body 7. In the present embodiment, the slide guide face 60 is set approximately at 45 degrees relative to the flat face 14 (a horizontal face) of the base body 7.

As shown in FIG. 4, FIG. 5, FIG. 7, and FIG. 9, in each slide guide face 60, there is respectively formed a recess 61. In the present embodiment, the recess 61 is formed with two portions leaving an interval in the front-back direction (a longitudinal direction) of the base body 7 per each slide guide face 60. In each recess 61 thereof, a length in the front-back direction is somewhat elongated more than a length in the width direction of the base body 7. A bottom portion (an inner bottom face) 61a of each recess 61 is receded into an inward side only for a constant depth in a vertical direction of the slide guide face 60, and a slope of the bottom portion 61a thereof is set in the same slope (approximately 45 degrees relative to the horizontal face) as the slide guide face 60.

Figure 7:
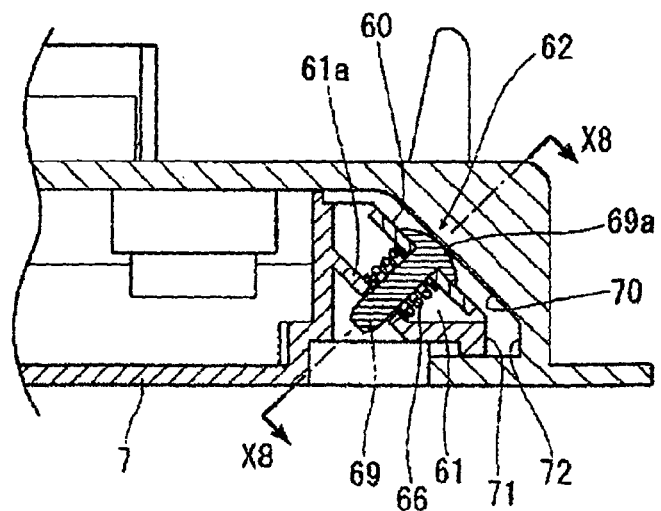
FIG. 7 is a cross-sectional view showing a state wherein the base body is slidably fitted into a slide main body.
Figure 8:
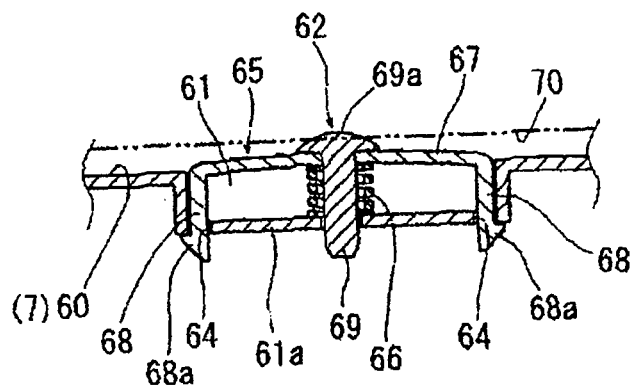
FIG. 8 is a cross-sectional view taken along a line X8-X8 in FIG. 7.
Figure 9:
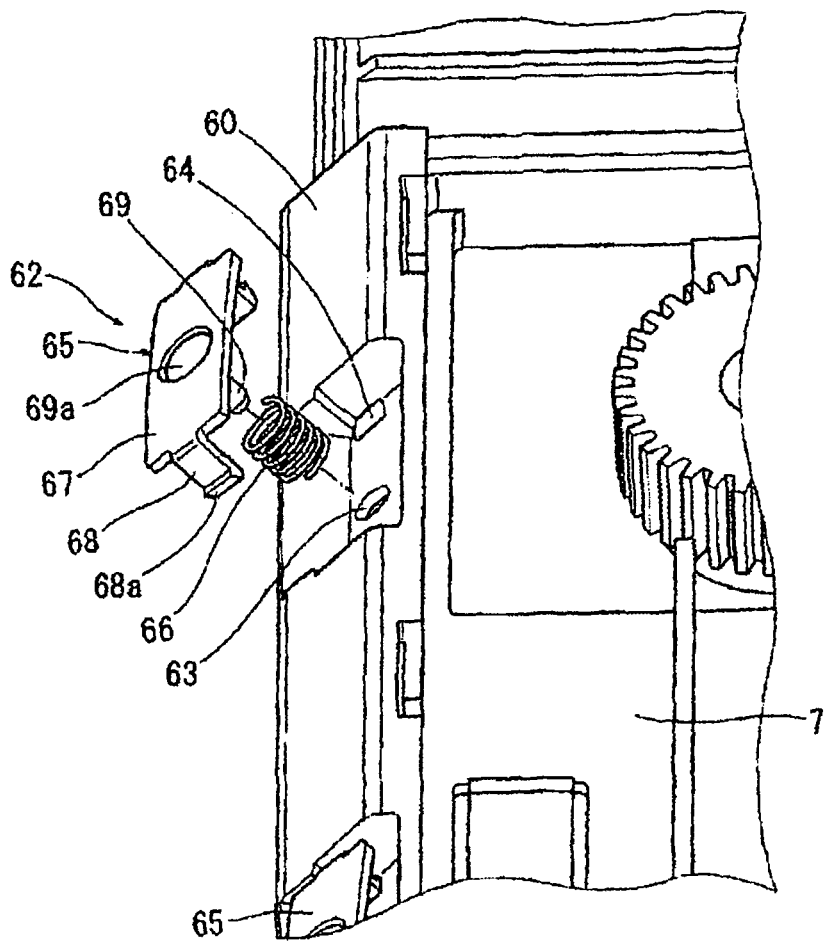
FIG. 9 is an explanatory drawing explaining an attachment of a pressing piece and a coil spring relative to a recess in the base body.

As shown in FIG. 7, FIG. 8, and FIG. 9, an urging structure (an urging device) 62 is respectively housed inside each recess 61. In the present embodiment, each urging structure 62 includes a guide hole 63; a pair of locking holes 64; a pressing piece 65 made of resin; and a coil spring 66. The guide hole 63 is formed in a center portion in the front-back direction of the base body 7 in the bottom portion 61a of the recess. The pair of locking holes 64 is formed on both sides in the front-back direction of the base body 7 in the same bottom portion 61a of the recess.

The pressing piece 65 integrally includes an abutment plate portion 67 having a plate shape (a band plate shape); a pair of locking leg portions 68; and a guide axis portion 69. The abutment plate portion 67 is formed in the band plate shape to correspond to the recess 61, and the abutment plate portion 67 thereof covers an opening of the recess 61 in a state wherein a longitudinal direction thereof faces in the front-back direction of the base body 7.

The pair of locking leg portions 68 droops from both sides in the longitudinal direction of the abutment plate portion 67 so as to be entered into the recess 61. Claw portions 68a of the pair of locking leg portions 68 thereof are detachably locked in the pair of locking holes 64 of the bottom portion 61a of the recess. Thereby, the pressing piece 65 is controlled from being detached from an inside of the recess 61. Also in a range of not receiving a control by a locking relationship (an abutment relationship) between the locking hole 64 (a peripheral border portion) and the claw portion 68a of the locking leg portion 68 (in a range wherein the locking leg portion 68 can slide the locking hole 64), the pressing piece 65 can be displaced inside and outside the recess 61 in the vertical direction relative to the slide guide face 60. Also, since the pressing piece 65 is made of resin, each locking leg portion 68 can bend, and based on that, if a pull-out force with a predetermined degree or above acts on the pressing piece 65, the claw portion 68a of each locking leg portion 68 comes out of the peripheral border portion of the locking hole 64, so that the pressing piece 65 can be pulled out.

The guide axis portion 69 is provided in a center portion in a longitudinal direction of the abutment plate portion 67 on a back face of the abutment plate portion 67. The guide axis portion 69 thereof extends in a direction departing from the back face of the abutment plate portion 67. The guide axis portion 69 is slidably inserted to pass through the aforementioned guide hole 63, and by a guide operation of the guide axis portion 69 and the guide hole 63, the pressing piece 65 (the abutment plate portion 67) is smoothly displaced inside and outside the recess 61. In the present embodiment, a pin 69 having a head portion 69a is used as the guide axis portion 69. Consequently, the head portion 69a having a curved face shape of the pin 69 thereof is positioned in a state protruding to a surface of the abutment plate portion 67.

The coil spring 66 is provided to be placed between the abutment plate portion 67 and the recess bottom portion 61a in a state wherein the guide axis portion 69 has been inserted inside the coil spring 66. The coil spring 66 provides an urging force in a direction away from the recess bottom portion 61a relative to the abutment plate portion 67. By the urging force of the coil spring 66, when an external force does not act on the abutment plate portion 67, the claw portion 68a of the locking leg portion 68 becomes a state locked in the peripheral border portion of the locking hole 64, and at that time, the surface of the abutment plate portion 67 thereof is positioned slightly outward more than the slide guide face 60 together with the head portion 69a.

In addition to that, as shown in FIG. 4 and FIG. 5, in the base body 7, there are provided a spring material 20 for urging the lid body 3 thereof forward by being associated with the lid body 3; and a pinion 21 (a rotational damper) for providing a resistance force relative to a slide of the lid body 3. Incidentally, FIG. 4 shows a state wherein the later-described engagement piece 29 has entered into the first positioning recess 15 as one of positioning recesses.

As shown in FIG. 2 and FIG. 3, the lid body 3 is slidably held relative to the base body 7. The lid body 3 includes a slide main body (a second member) 22 forming a formation portion of the other slide structural portion of the slide structure; and a cover body 23. In the slide main body 22, an upper face thereof is covered by the cover body 23.

Figure 6:
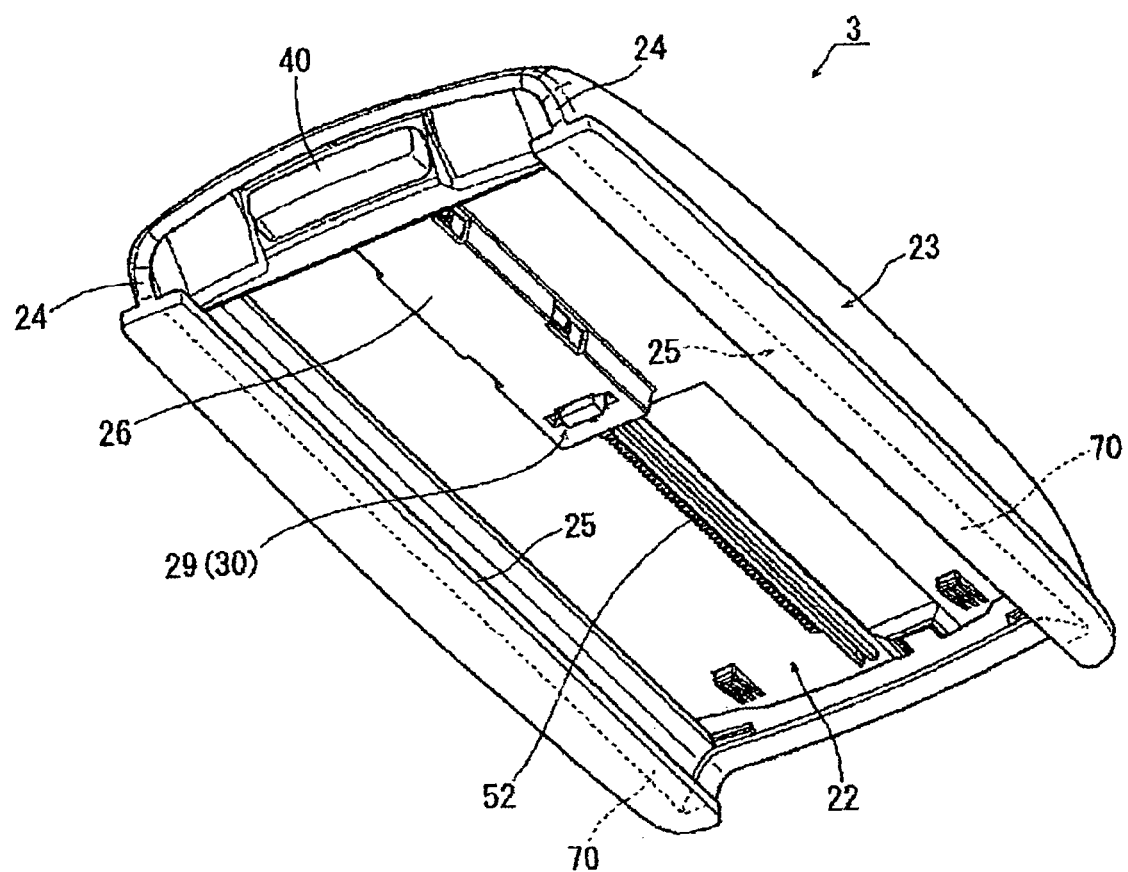
FIG. 6 is a perspective view showing a state wherein the lid body according to the embodiment is viewed from a back face side.

The slide main body 22 is formed approximately as a long plate body corresponding to the base body 7, and on both width-direction sides of the slide main body 22, there are respectively provided drooping wall portions 24. In an inner face of each drooping wall portion 24, there is respectively provided a guide portion 25 in such a way as to extend in a front-back direction (a longitudinal direction), and as shown in FIG. 6 and FIG. 7, each guide portion 25 forms a slide inclined face (an inclined face) 70 inclined in such a way as to come close to a lower face of the slide main body 22 as the slide inclined face 70 goes outward in the width direction of the slide main body 22; and a slide support face 71 projecting inward in the width direction of the slide main body 22 by continuing to a lower portion of the slide inclined face 70 thereof. Incidentally, in the present embodiment, an uprise inner face 72 is interposed between the slide inclined face 70 and the slide support face 71. Such slide main body 22 is disposed on the base body 7 in such a way as to surround the base body 7 in an inside thereof, and accompanied by that, each slide inclined face 70 is disposed to face each slide guide face 60. Also, on each slide support face 71, there is supported a lower face of an outside in the width direction of the base body. Thereby, the slide main body 22 slides in the front-back direction relative to the base main body 7 based on a guide operation of the slide guide face 60, the slide inclined face 70, and the like of the base body 7 (the slide structure).

In that case, as shown in FIG. 7 and FIG. 8, each slide inclined face 70 abuts against the head portion 69a on the surface of the abutment plate portion 67 so as to allow the abutment plate portion 67 to retract to the inside of the recess 61 against the coil spring 66. Consequently, a repulsion force of the coil spring 66 vertically acts on the slide inclined face 70 as an urging force, and the urging force acts on the slide inclined face 70 as an upward component force and a width-direction outward component force. As a result, the slide main body 22 is controlled from wobbling in an up-and-down direction and the width direction at a slide time as well as a positioning time.

In FIG. 7, the reference numeral 52 represents a rack engaging with the aforementioned pinion 21 disposed on the base body 7.

Figure 10:
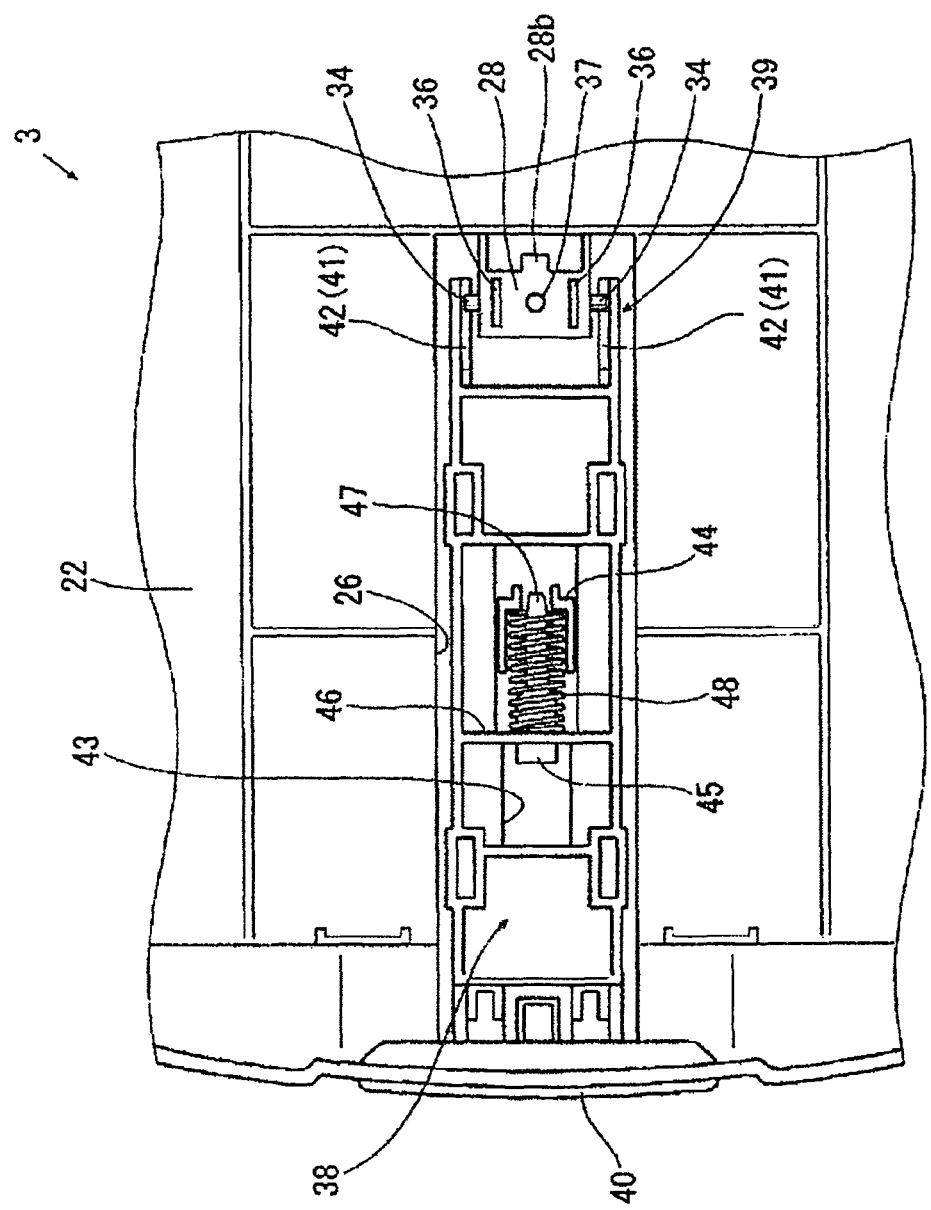
FIG. 10 is a plan view showing the slide main body according to the embodiment.
Figure 11:
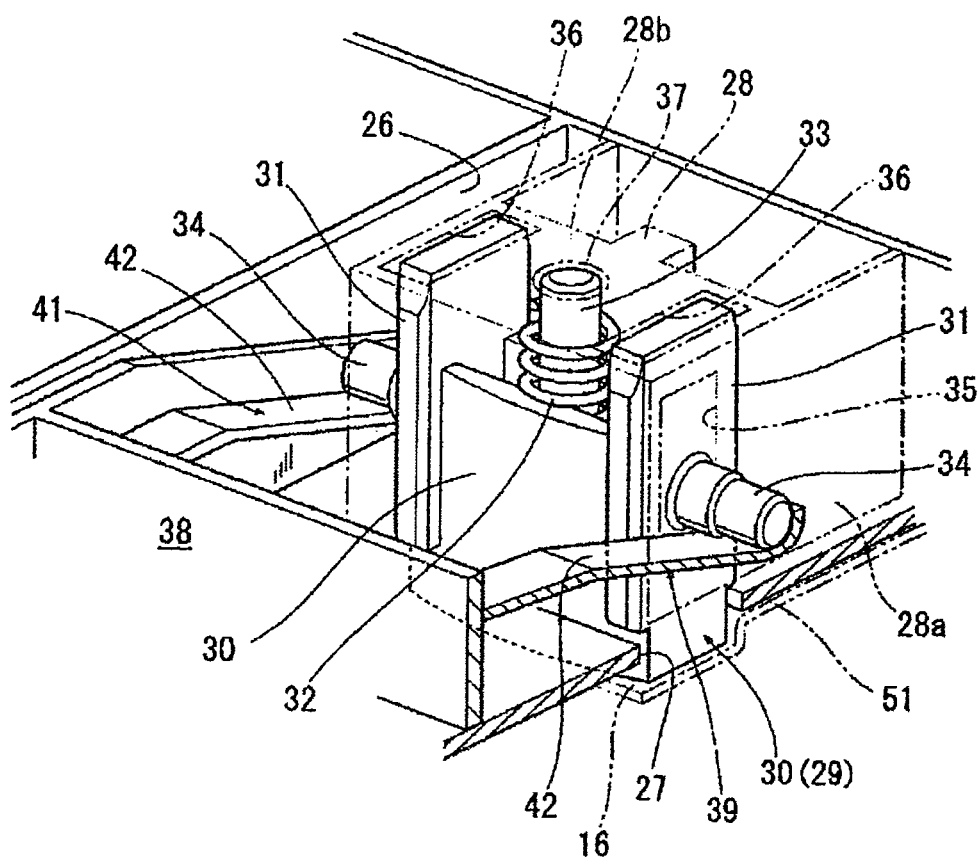
FIG. 11 is an explanatory drawing explaining ascending and descending movements of an engagement piece according to the embodiment.
Figure 12:
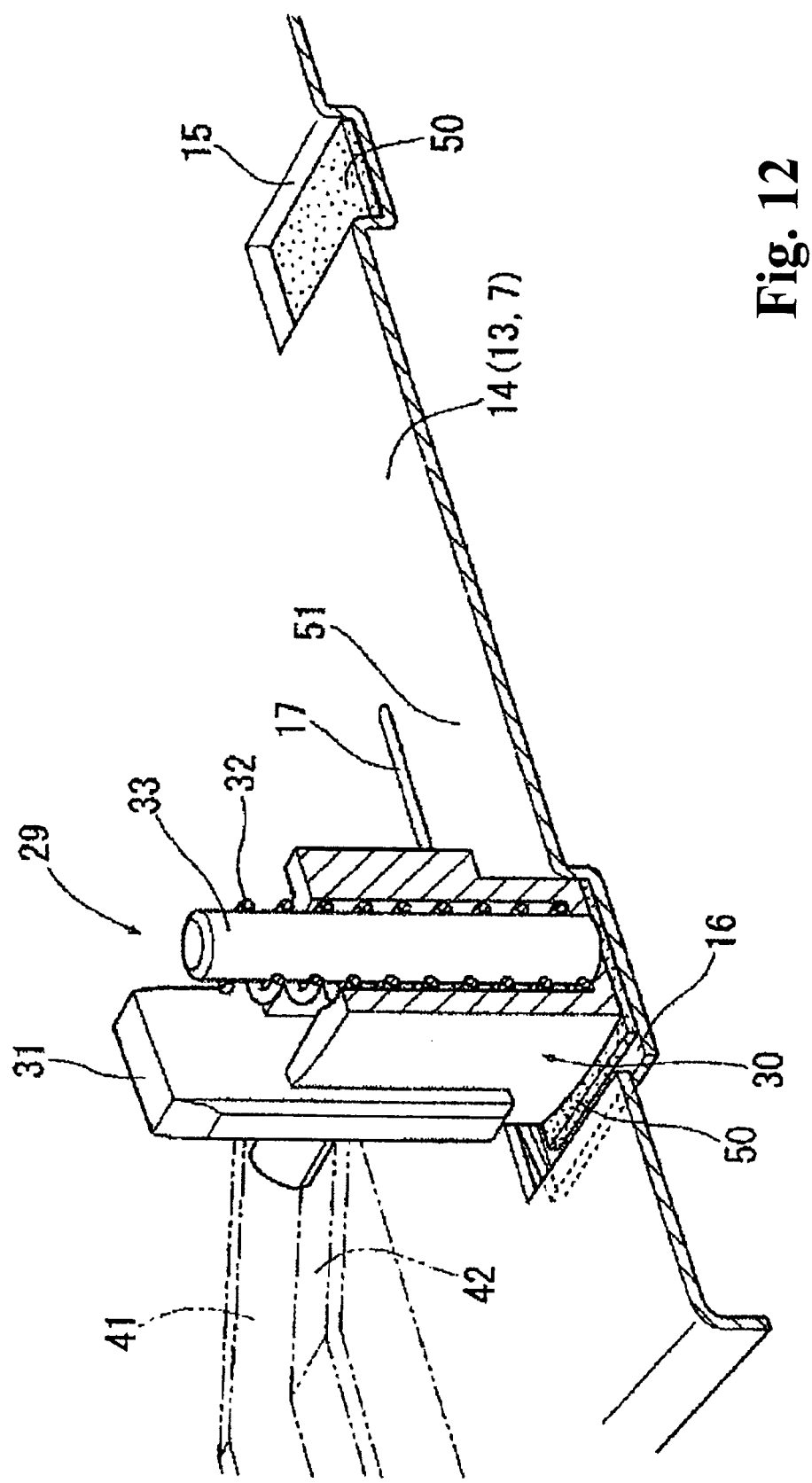
FIG. 12 is an explanatory drawing showing a relationship between the engagement piece according to the embodiment and each positioning recess.

As shown in FIG. 2, FIG. 3, FIG. 10 and FIG. 11, in the slide main body 22, there is formed a guide recess 26. The guide recess 26 is formed by enlarging the slide main body 22 out to a lower side, and the guide recess 26 extends backward from a front end of the slide main body 22 and reaches up to approximately a center in an extending direction of the slide main body 22. In a bottom portion of the guide recess 26, at a back end side thereof, there is formed a long hole 27 (see FIG. 11) in such a way as to extend in a width direction thereof. Also, there is provided a guide box 28 in such a way as to cross the long hole 27 in a front-back direction, and there is provided the engagement piece 29 to be placed inside the guide box 28. As shown in FIG. 11 and FIG. 12, the engagement piece 29 includes an engagement-piece main body portion 30; a pair of guide plate portions 31 functioning as both side wall portions of the engagement-piece main body portion 30 and protruding upward; a spring-placement pin portion 33 protruding upward as is the case with the guide plate portion 31 from a center portion of the engagement-piece main body portion 30 and placing the coil spring 66 on an outer circumference thereof; and a pair of raising-and-lowering guide axis portions 34 protruding laterally from each guide plate portion 31 of the engagement-piece main body portion 30. The guide box 28 includes an opening in a lower portion thereof, and an inside of the guide box 28 faces the long hole 27 through a lower-portion opening thereof (the reference numeral 27 also represents the lower-portion opening of the guide box 28). Also, in the guide box 28, both side wall portions 28a thereof are positioned on an inward side in a longitudinal direction of the long hole 27. In each side wall portion 28a, a notch 35 is respectively formed in such a way as to extend in an up-and-down direction, and a notch end on a lower end side of each notch 35 is open to the long hole 27 in the bottom portion of the guide recess 26. Thereby, the engagement piece 29 is housed inside the guide box 28 through the long hole 27 from a lower face side of the slide main body 22, and each raising-and-lowering guide axis portion 34 of the engagement piece 29 thereof protrudes outward from the notch 35 of the guide box 28 after passing through the long hole 27. Also, in an upper wall portion 28b of the guide box 28, there are respectively formed through-holes 36 and 37 through which the pair of guide plate portions 31 and the spring-placement pin portion 33 can pass. The pair of guide plate portions 31 and the spring-placement pin portion 33 pass through each through-hole 36 and 37 to be displaced, so that the engagement piece 29 can be displaced in the up-and-down direction, and accompanied by that, the engagement piece 29 can be in a state wherein a lower end portion of the engagement-piece main body portion 30 has protruded downward from a lower face of the bottom portion of the guide recess 26 (the lower face of the slide main body 22), and a state wherein the lower end portion of the engagement-piece main body portion 30 has exited into the guide box 28 from a protruding state thereof.

Also, as shown in FIG. 2, FIG. 3, FIG. 10, and FIG. 11, inside the guide recess 26, there is slidably housed a long moving body 38. The moving body 38 extends by being ranged between the guide box 28 and a front portion of the slide main body 22, and in a back end portion thereof, there is formed a raising-and-lowering mechanism 39, and in a front end portion thereof, there is attached an operation button 40 as a locking-piece operation device. The raising-and-lowering mechanism 39 includes a pair of leg portions 41 crossing the long hole 27 while sandwiching the side wall portions 28a of the guide box 28, and in each leg portion 41 thereof, there is respectively formed a guide face 42. Both guide faces 42 are inclined in such a way as to go up as moving on to a front end portion side of the moving body 38, and have a function receiving the pair of raising-and-lowering guide axis portions 34 of a locking piece and allowing the pair of raising-and-lowering guide axis portions 34 to move up and down based on a forward-and-backward movement of the inclined guide faces 42 thereof. In that case, a coil spring 32 of the spring-placement pin portion 33 is interposed between the engagement-piece main body portion 30 and the upper wall portion 28b of the guide box 28, and by an urging force of the coil spring 32, the engagement piece 29 is urged in a direction wherein each raising-and-lowering guide axis portion 34 is pressed against each guide face 42. Also, as shown in FIG. 10, in the moving body 38, there is formed a wide slit 43 extending in a front-back direction in an inward side in an extending direction, and the wide slit 43 thereof faces the bottom portion of the guide recess 26. In the bottom portion of the guide recess 26, while a spring receiver 44 and a stopper 45 are provided to stand inside the slit 43, there is provided a partition wall 46 between the spring receiver 44 and the stopper 45 in the moving body 38. In the partition wall 46, a spring placement pin 47 protrudes toward the spring receiver 44, and in the spring placement pin 47, a coil spring 48 is placed. By an urging force of the coil spring 48 thereof, the moving body 38 is urged in a direction wherein the partition wall 46 abuts against the stopper 45. Thereby, when the partition wall 46 abuts against the stopper 45, the moving body 38 is positioned in the most forward position, and at that time, a height of the pair of guide faces 42 in which the pair of raising-and-lowering guide axis portions 34 is positioned (abutted) becomes the lowest state. Also, the lower end portion of the engagement-piece main body portion 30 in the engagement piece 29 becomes a state protruding downward from the lower face of the slide main body 22. On the other hand, when the operation button 40 is pressed, the moving body 38 moves backward and the pair of guide faces 42 also goes backward. By each guide face 42 thereof, the raising-and-lowering guide axis portions 34 are lifted upward, and accompanied by that, the lower end portion of the engagement-piece main body portion 30 exits into the guide box 28 (the guide recess 26) from the aforementioned protrusion state.

The engagement piece 29 is disposed in such a way that a movement area thereof accompanied by a slide of the slide main body 22 faces relative to the first positioning recess 15 and the second positioning recess 16. Thereby, in a state of a non-operation time of the operation button 40, when the lower end portion of the engagement-piece main body portion 30 is positioned in a position facing an inside of the first positioning recess 15, the lower end portion of the engagement-piece main body portion 30 enters into the first positioning recess 15, and by an engagement relationship between the lower end portion of the engagement-piece main body portion 30 and inner walls (front and back walls) of the first positioning recess 15, the lid body 3 is held in a state overlapped with the base body 7 approximately in whole (a state in FIG. 2). On the other hand, when the lower end portion of the engagement-piece main body portion 30 is positioned in a position facing an inside of the second positioning recess 16, as shown in FIG. 12, the lower end portion of the engagement-piece main body portion 30 enters into the second positioning recess 16, and by an engagement relationship between the lower end portion of the engagement-piece main body portion 30 and inner walls (front and back walls) of the second positioning recess 16, the lid body 3 is held in a state protruding from the base body 7 (a state in FIG. 3).

Therefore, in such console box 1, when the lower end portion of the engagement-piece main body portion 30 has entered into the first positioning recess 15, the lid body 3 is positioned in the state overlapped with base body 7 approximately in whole, and when the lower end portion of the engagement-piece main body portion 30 has protruded into the second positioning recess 16, the lid body 3 is positioned in a protrusion state protruding forward more than the base body 7. Each state thereof is held as long as the engagement piece 29 is prevented from exiting from the inside of each positioning recess 15 (16) by pressing the operation button 40, and the lid body 3 is held by a strong positioning held state. On the other hand, regarding a positioning adjustment of the lid body 3, by pressing the operation button 40, the engagement piece 29 in an entered state exits from the positioning recess (the first or second positioning recess 16), and while maintaining that state, if a slide force is provided to the lid body 3, the lid body 3 smoothly slides relative to the base body 7. Consequently, by moving the engagement piece 29 of the lid body 3 to another positioning recess (the second or first positioning recess 15), the positioning at that portion can be easily carried out.

Also, between the slide inclined face 70 of the inner face of the drooping wall portion 24 of the slide main body 22 and the slide guide face 60, there is interposed the pressing piece 65 (the urging structure 62) on both width-direction sides of the base body 7. Since the pressing piece 65 (the abutment plate portion 67) retracts to the inside of the recess against the coil spring 66, the repulsion force of the coil spring 66 vertically acts on the slide inclined face 70 as the urging force, and the urging force thereof acts as the upward component force and the width-direction outward component force. Consequently, the lid body 3 (the slide main body 22) can control the wobbling in the up-and-down direction and the width direction thereof at the slide time as well as the positioning time only by the urging structure 62 without providing both the urging structure 62 for controlling the wobbling in the up-and-down direction and an urging structure for controlling the wobbling in the width direction thereof.

Especially, in the present embodiment, since the slide inclined face 70 and the slide guide face 60 are set approximately at 45 degrees relative to the horizontal face, the urging force acts on the slide main body 22 equally in the up-and-down direction and outward on both width-direction sides thereof so as to reliably and effectively control the wobbling of the lid body 3.

Furthermore, when the urging force is provided to the slide inclined face 70, the head portion 69a having the curved face shape abuts against the slide inclined face 70, so that a sliding resistance can be reduced more than in a case wherein a whole abutment plate portion 67 abuts against the slide inclined face 70. Consequently, while controlling the wobbling, a decrease of operability of an occupant can be controlled.

Also, when an operator provides a pull-out force to the pressing piece 65, and unlocks the claw portion of the locking leg portion 68 and the peripheral border portion of the locking hole 64, the pressing piece 65 can be removed from the recess 61. Consequently, the coil spring 66 can be easily replaced with a spring having a different spring coefficient, and accompanied by that, an urging force by the pressing piece 65 can be easily adjusted.

Figure 13:
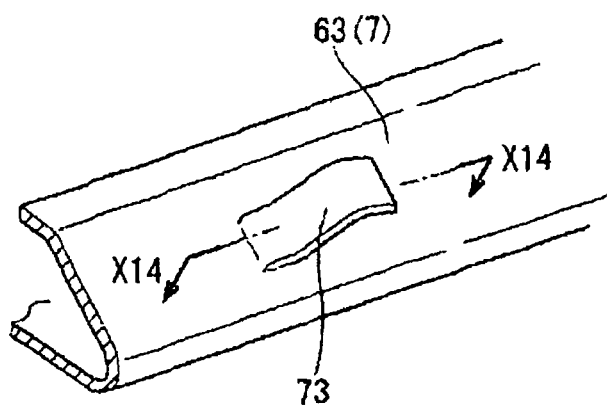
FIG. 13 is a perspective view showing an urging structure (a flexure piece) according to another embodiment.
Figure 14:
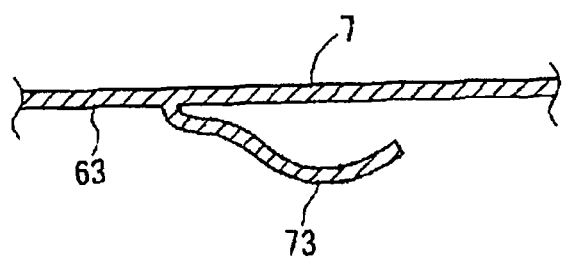
FIG. 14 is a cross-sectional view taken along a line X14-X14 in FIG. 13.

FIG. 13 and FIG. 14 show another embodiment. In the embodiment, regarding the same structural elements as the above-mentioned embodiment, the same symbols are assigned and their explanations are omitted.

In the embodiment in FIG. 13 and FIG. 14, as for the urging structure 62, a flexure piece 73 having a cantilever shape is shown.

Namely, the flexure piece 73 having the cantilever shape is integrally provided respectively in each slide guide face 60, and when the guide portions 25 on both width-direction sides in the slide main body 22 are slidably fitted in both side portions of the base body 7, the flexure piece 73 abuts against the slide inclined face 70 of the slide main body 22 and is bended so as to generate a repulsive urging force. The urging force acts on the slide main body 22 (the slide inclined face 70) as in the case of the above-mentioned embodiment, so that the lid body 3 (the slide main body 22) is controlled from wobbling in the up-and-down direction and the width direction thereof.

The embodiments have been explained hereinbefore, however, in the present invention, the following aspects will be included.

(1) Only one of either the slide guide face 60 or the slide inclined face 70 has the inclined face.

(2) The urging structure 62 is provided on a slide main body 22 side.

(3) In place of the head portion 69a, the surface of the abutment plate portion 67 forming the pressing piece 65 is curved, and the curved abutment plate portion 67 thereof abuts against the slide inclined face 70.

(4) The slide structure according to the present invention is applied to something other than the console box.

An object of the present invention implicitly includes providing of an embodiment which is not limited to the specified ones and is described as being substantially preferred or as an advantage.

What is claimed is:

1. A slide structure, comprising:
a first member maintaining a constant width;
a second member covering at least two side portions of the first member in a width direction, and slidably assembled relative to the first member; and
an urging device interposed between the first member and the second member,
wherein in at least one member of either the first member or the second member, an inclined face inclining relative to the width direction of the first member is provided at a portion wherein the first member and the second member slide,
in another member of either the first member or the second member, a facing portion is provided to face the inclined face of said one member, and the urging device detachably attached on said another member is interposed between the facing portion and the inclined face, to be urged in a direction to separate the facing portion and the inclined face from each other,
the urging device includes a pressing piece displaceably supported in said another member, and a spring disposed between the pressing piece and said another member to urge the pressing piece toward said one member,
the pressing piece of the urging device includes a locking leg portion disposed slidably against said another member, and a claw portion formed at an end portion of the locking leg portion to lock the pressing piece to said another member and to restrict the pressing piece from protruding toward said one member more than a predetermined amount, and
the locking leg portion elastically deforms so that the claw portion releases the lock between the first and second members to detach the pressing piece and the spring from said another member.

2. A slide structure according to claim 1, wherein an angle of the inclined face is set approximately at 45 degrees relative to the width direction of the first member.

3. A slide structure according to claim 1, wherein the slide structure is adapted to be interposed between a box main body and a lid body forming an armrest on an upper side of the box main body in a console box for usage.

4. A slide structure according to claim 1, wherein the pressing piece further comprises an abutment plate portion disposed parallel to the inclined face and integrally formed with the locking leg portion at an end portion of the abutment plate portion, the locking leg portion extending perpendicular to the abutment plate portion and toward said another member to slide against said another member.

5. A slide structure according to claim 4, wherein the pressing piece further comprises a guide axis portion disposed at a center of the abutment plate portion, and the guide axis portion includes a head portion having a curved shape protruding from the abutment plate portion toward the inclined face to abut and urge the inclined face, and a pin protruding toward said another member in a direction parallel to the locking leg portion and being inserted through the spring.

6. A slide structure according to claim 5, further comprising a recess formed on the facing portion of said another member to receive the pressing piece, the recess having a bottom portion so that the spring is arranged between the bottom portion and said another surface of the abutment plate portion to urge the pressing piece toward said one member.

7. A slide structure according to claim 6, wherein the bottom portion of the recess further comprises a locking hole to detachably attach the claw portion of the locking leg portion, and a guide hole to slidably insert the pin of the guide axis portion, so that when the head portion of the guide axis portion abuts against the inclined face, and the locking leg portion and the pin respectively slides through the locking hole and the guide hole to retract the abutment plate portion into the recess.

8. A slide structure according to claim 7, wherein the inclined face of said one member is structured to divide an urging force of the urging device into a component force in the width direction of the first member and a component force in a direction perpendicular to the width direction to allow each component force thereof to act between the first and second members.

9. A slide structure according to claim 8, wherein the second member includes a guide recess arranged in the second member for positioning the second member in predetermined positions on the first member, a moving body housed in the guide recess to slide in a horizontal direction of the second member, and an engagement piece disposed in an end of the guide recess, the engagement piece having a raising-and-lowering guide axis portion protruding from a side thereof and being movable in a vertical direction of the second member to protrude from and retract into the guide recess, and the moving body includes a leg portion with a surface gradually inclining in an upward direction to receive the raising-and-lowering guide axis so that when the moving body is moved toward said end of the guide recess, the raising-and-lowering guide axis portion moves upwardly, and the engagement piece retracts inside the guide recess to disengage the first member.

\* \* \* \* \*